(12) United States Patent
Krause et al.

(10) Patent No.: US 12,154,045 B2
(45) Date of Patent: Nov. 26, 2024

(54) RESERVATION OF LOCK BOX FACILITIES

(71) Applicants: Marco Krause, Bonn (DE); Henning Gaudszuhn, Cologne (DE)

(72) Inventors: Marco Krause, Bonn (DE); Henning Gaudszuhn, Cologne (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/532,761

(22) Filed: Nov. 22, 2021

(65) Prior Publication Data

US 2022/0083923 A1 Mar. 17, 2022

Related U.S. Application Data

(62) Division of application No. 14/744,784, filed on Jun. 19, 2015, now Pat. No. 11,244,251.

(30) Foreign Application Priority Data

Jun. 25, 2014 (DE) ..................... 10 2014 108 921.9

(51) Int. Cl.
G06F 17/00 (2019.01)
G06Q 10/02 (2012.01)
G07C 9/27 (2020.01)
G07F 17/12 (2006.01)

(52) U.S. Cl.
CPC ............... *G06Q 10/02* (2013.01); *G07C 9/27* (2020.01); *G07F 17/12* (2013.01); *G07F 17/13* (2020.05)

(58) Field of Classification Search
CPC .......... G06Q 10/02; G07C 9/27; G07F 17/12; G07F 17/13
USPC ........................................................ 705/5
See application file for complete search history.

(56) References Cited

U.S. PATENT DOCUMENTS

| 8,041,586 | B2 | 10/2011 | Jethani et al. |
| 10,074,068 | B2* | 9/2018 | Irwin ........................ G07F 5/18 |
| 2002/0035515 | A1 | 3/2002 | Moreno |
| 2002/0080030 | A1 | 6/2002 | Inomata |
| 2003/0025590 | A1 | 2/2003 | Gokcebay et al. |
| 2004/0199284 | A1 | 10/2004 | Hara |
| 2007/0278910 | A1 | 12/2007 | Cash et al. |

(Continued)

FOREIGN PATENT DOCUMENTS

| CN | 102456171 A | 5/2012 |
| DE | 102006047797 A1 | 4/2008 |

(Continued)

*Primary Examiner* — Russell S Glass
(74) *Attorney, Agent, or Firm* — Reinhart Boerner Van Deuren P.C.

(57) ABSTRACT

A method to operate at least one electronic lock box facility that includes detection of information about at least one lock box unit of a lock box facility of at least one lock box facility in which a shipment associated with a party is to be deposited, by a computing unit, based on a reservation for this lock box facility associated with a party, whereby the reservation information contains lock box type related information that comprises the number of dynamically reserved lock box units of a lock box type, the section of a lock box unit of at least one lock box unit based on the determined, provided information; acquisition of an identifier associated with the shipment to be deposited in the lock box facility by means of detection; and linking of the acquired identifier of the shipment with the selected lock box unit.

20 Claims, 5 Drawing Sheets

(56) References Cited

U.S. PATENT DOCUMENTS

| | | |
|---|---|---|
| 2012/0062362 A1 | 3/2012 | Rudduck et al. |
| 2013/0144428 A1* | 6/2013 | Irwin .................... G07F 17/10 |
| | | 700/218 |
| 2015/0254760 A1 | 9/2015 | Pepper |

FOREIGN PATENT DOCUMENTS

| | | | | |
|---|---|---|---|---|
| EP | 1921586 A1 | 5/2008 | | |
| GB | 248863 A | 3/1926 | | |
| WO | WO-0051750 A1 * | 9/2000 | ........... | A47G 29/141 |
| WO | WO-0207119 A1 * | 1/2002 | ........... | A47G 29/141 |

* cited by examiner

RESERVATION OF LOCK BOX FACILITIES

CROSS-REFERENCE TO RELATED PATENT APPLICATION

This patent application is a divisional of U.S. patent application Ser. No. 14/744,784, filed Jun. 19, 2015, which claims priority to German Application No. 10 2014 108 921.9, filed Jun. 25, 2014, the entire teachings and disclosure of which are incorporated herein by reference thereto.

FIELD OF THE INVENTION

Exemplary embodiments of the invention pertain to a system for operating at least one electronic lock box facility wherein every lock box facility comprises a plurality of lock box units, system components, and methods performed by these components.

BACKGROUND OF THE INVENTION

A party who currently wants to place a shipment in an electronic lock box facility such as a drop box, a specific lock box unit (compartment) must be reserved for this party.

This method is very rigid and inflexible, however, and causes many more lock box units to be reserved than are ultimately used, causing unused lock box unit capacities.

SUMMARY OF THE INVENTION

The objective of the present invention is therefore to solve this problem.

The first aspect of the invention discloses a method to operate at least one electronic lock box facility wherein every lock box facility comprises a plurality of lock box units, comprising the following:

Determination of information about at least one lock box unit of a lock box facility of at least one lock box facility, in which a shipment associated with a party is to be deposited, by a computing unit, based on reservation information associated with the party for this lock box facility, wherein the reservation information associated with the party contains lock box type related information comprising for each lock box type of at least one lock box type of the lock box facility information about the number of dynamically reserved lock box units of the lock box type, Selection of a lock box unit of at least one lock box unit based on the determined, provided information;

Acquisition of an identifier physically associated with the shipment to be deposited in the lock box facility by a means of detection; and Linking of the acquired shipment identifier with the selected lock box unit.

The second aspect of the invention discloses a method to operate at least one electronic lock box facility wherein the method comprises the following:

Reception of an electronic request associated with a party for the dynamic reservation of a specific number of lock box units of a lock box type of a lock box facility of at least one lock box facility, Verification that the requested number of lock box units of the lock box type is available for the party, and If the requested number of lock box units of the lock box type is available for the party, adjustment of reservation information associated with the party and the lock box facility, which comprises lock box related information, wherein the lock box type related information for the lock box type of the lock box facility comprises information about the number of dynamically reserved lock box units of the lock box type, for the dynamic reservation of the defined number of lock box units of the lock box type of the lock box facility.

According to each of these aspects of the invention, the following is disclosed for each:

A computer program, comprising program instructions that cause a processor to execute and/or control the method in accordance with the respective aspect of the invention, when the computer program runs on the processor. In this specification, the term processor is to be understood, inter alia, as including control units, microprocessors, micro control units such as micro controllers, digital signal processors (DSP), application-specific integrated circuits (ASICs), or field programmable gate arrays (FPGAs). In the method, either all steps of the method can be controlled or executed, or one or several steps can be controlled and one or several steps executed. The computer program can, for example, be distributable by means of a network such as the Internet, a telephone or mobile radio network, and/or a local network. The computer program can at least partially consist of software and/or firmware of a processor. It can equally be implemented at least partially as hardware. The computer program can, for example, be stored on a computer-readable storage medium, for example, a magnetic, electric, electromagnetic, optic, and/or other type of storage medium. The storage medium can, for example, be part of the processor, for example, a (non-permanent or permanent) program memory of the processor or a part thereof.

An apparatus, configured to perform and/or control the method according to the respective aspect of the invention or comprising the respective means for the performance of the method steps in accordance with the respective aspect of the invention. In the method, either all steps of the method can be controlled or executed, or one or several steps can be controlled and one or several steps executed. One or a plurality of the means can also be executed and/or controlled by the same unit. For example, one or a plurality of the means can be formed by one or a plurality of processors.

An apparatus comprising at least one processor and at least one memory containing the program code wherein the memory and the program code are configured to cause the apparatus with at least one processor to execute and/or control at least the method in accordance with the respective aspect of the invention. In the method, either all steps of the method can be controlled or executed, or one or several steps can be controlled and one or several steps executed.

Every lock box facility of at least one lock box facility comprises a plurality of lock box units. Each of the lock box units of the plurality of lock box units is, for example, assigned a locking means which is configured to open or lock the respective lock box unit. The locking means can be controlled by an electric signal wherein, for example, a lock box facility features a control unit to control the locking means of the lock box units. Thus, a lock box unit represents a lock box compartment.

A lock box unit of at least one lock box unit may comprise different types of lock box units (lock box compartments) wherein the different lock box types differ, for example, in their form and/or size. At least one lock box unit of a lock box facility can, for example, be associated with a first lock box unit of this lock box facility, and at least one lock box unit of this lock box facility can be associated with a second lock box type, and, for example, at least one lock box unit of this lock box facility can be associated with a third lock box type wherein, for example, the first lock box type has a small size, the second lock box type has, for example, a medium size, and the third lock box type has, for example, a large size. It is understood that the invention is not limited to exactly three different lock box types, but may comprise any number of at least two different lock box types.

A lock box facility of at least one lock box facility can, for example, be connected with a server via a data network wherein the server can be configured to control a lock box facility of at least one lock box facility. This data network can comprise, for example, the Internet and/or other data networks.

If a party wants to deposit a shipment in a lock box unit, this takes place on the basis of reservation information associated with the party for this lock box facility, which can, for example, be stored in the server and/or in a memory of the respective lock box facility. This reservation information associated with the party and the lock box facility comprises lock box type related information comprising for every lock box type of at least one lock box type of the respective lock box facility information about the number of dynamically reserved lock box units of the lock box type. Thus, a party can reserve a number of lock box units of a lock box type for a particular lock box facility in advance. The second aspect of the invention addresses this reservation in detail. A party may, for example, electronically access the server by means of an interface and there store the respective lock box type related information for a lock box type or a plurality of lock box types of a lock box facility.

A shipment may, for example, be a package, but also any other object that is to be deposited in a lock box unit of a lock box facility, for example, to hand over the object from one party to a recipient.

The number of lock box units can mean a number of exactly one or also a number of two or more lock box units. This lock box type related information associated with the party and the lock box facility, which comprises for every lock box type of at least one lock box type of the respective lock box facility information about the number of dynamically reserved lock box units of the lock box type, does not contain an assignment to a specific or a plurality of specific lock box units of the lock box type; ultimately, a number of lock box units of the respective lock box type in the respective lock box facility is reserved for the party without making a specific assignment to lock box units in the lock box facility.

According to the first aspect of the invention, information about at least one lock box unit of a lock box facility of at least one lock box facility, in which a shipment associated with a party is to be deposited, is provided by a data processing unit based on reservation information associated with the party for this lock box facility when a party wants to deposit a shipment in a lock box unit of a lock box facility. This data processing unit may, for example, be arranged in the lock box facility or in the server. This information about at least one lock box unit of a lock box facility of at least one lock box facility in which a shipment associated with a party is to be deposited can, for example, only comprise the lock box type related information referenced above or, alternatively, other information as well.

Based on this acquired information about at least one lock box unit of a lock box facility of at least one lock box facility in which a shipment associated with a party is to be deposited, a lock box unit of at least one lock box unit of the lock box facility is selected. This selection process may be carried out at least with support from the data processing unit of the lock box facility and/or the data processing unit of the server. During the selection of a lock box unit of at least one lock box unit, it is therefore possible to take into account the reservation information from the party, including lock box type related information. Because the lock box type related information does not comprise any assignment to a particular lock box unit or a plurality of specific lock box units of the lock box facility, no specific lock box units of the lock box facility must be reserved in advance on the basis of the lock box type related information; rather, only the number of lock box units for the respectively reserved lock box type of the lock box facility is, for example, reserved in advance, so that, for example, the server and/or the respective lock box facility ensures that at least the reserved number of the lock box units for the respectively reserved lock box type of the lock box facility is kept available for the party; the availability of these units may, however, depend on other facts such as the priority of parties and/or the particular date and time for which the reservation is valid. This may have the advantage that no specific unit is reserved for a shipment in advance and is thus blocked by this reservation and that a shipment is not, for example, assigned until it is deposited in the respective lock box facility. This way, it is possible to avoid a lock box unit being firmly reserved for a shipment and turning out to be defective when the attempt is made to deposit the shipment, and it is therefore no longer possible to deposit the shipment in the lock box facility, because only the number of lock box units of the respective lock box type of the lock box facility is reserved.

Thus, the lock box unit of at least one lock box unit of the lock box facility is selected after the reservation based on the lock box type related information. This selection does not occur, for example, until the party wishes to deposit the shipment in the respective local lock box facility after having signed in and/or identified the party at the respective lock box facility or the server for the purpose of the subsequent depositing of the shipment in the lock box facility.

Furthermore, physically assigned identifiers of a shipment to be deposited in a lock box facility are acquired such as specific identifiers applied to the shipment, which may be a bar code, printed alphanumeric information, or another suitable identifier. This identifier may, for example, be a shipment ID with which the shipment can be tracked. The lock box facility may, for example, comprise a means for the acquisition of this identifier physically associated with the shipment such as a scanner or another suitable means, or a mobile terminal may be provided, which comprises this means to acquire this identifier physically associated with the shipment, whereas the mobile terminal may communicate the acquired identifier, for example, through a preferably wireless communication link to the lock box facility and/or the acquired identifier through a preferably wireless communication link to the server.

After the selection of a lock box unit of the lock box facility, this lock box unit is, for example, automatically opened by the lock box facility, or the display means of the lock box facility may provide information indicating which lock box unit of the lock box facility is to be used for depositing the shipment, so that the party can deposit the shipment in the opened lock box unit or the displayed lock box unit.

Furthermore, the acquired shipment identifier is linked with the selected lock box unit. Thus, the shipment is associated with the selected lock box unit of the lock box facility only when the shipment is deposited in the lock box unit, but not during the previous dynamic reservation.

In an exemplary embodiment of all aspects of the invention, the lock box facility of at least one lock box facility comprises a plurality of different lock box types, which preferably differ from each other in size.

In an exemplary embodiment of all aspects of the invention, the reservation information associated with the party comprises information about at least one statically reserved lock box unit of the lock box facility.

Thus, a party may, for example, firmly and therefore statically reserve at least one lock box unit of the lock box facility in addition to the lock box type specific reservation, which does not comprise a specific lock box unit of a lock box facility. This static reservation of at least one lock box unit of a lock box facility does not, however, include an assignment of the statically reserved lock box to a shipment. Only the at least one statically reserved lock box unit of the lock box facility is reserved for the respective party. The quantity of statically reserved lock box units of a lock box facility decreases the number of lock box units of a lock box type that are potentially available for reservation. A static reservation of a lock box unit may, for example, and in contrast to the dynamic reservation of a number of lock box units of a lock box type, continue to exist, so that the statically reserved lock box units of a lock box facility remain available on a continual basis.

In an exemplary embodiment of the first aspect of the invention, the method comprises the displaying of a number of lock box units of the lock box facility available to the party for at least one lock box type based on the information about at least one lock box unit of a lock box facility for at least one display of the following displays: (i) display of the lock box facility; and (ii) display on a mobile electronic device configured for a party's use.

What can therefore be displayed to the party regarding a lock box type of the lock box facility or regarding a plurality of lock box types of the lock box facility is how many lock box units of the respective lock box type are available to the party for the deposit of shipments. The party can, for example, be identified in advance by the lock box facility or the server.

In an exemplary embodiment of the first aspect of the invention, the selection of a lock box unit of at least one lock box unit of the lock box facility can, at least partially, be performed on the basis of the number of the lock box units of the lock box facility displayed to the party as available for at least one lock box type by detecting an interaction of a shipper with the lock box facility.

Thus, the party can, for example, based on the number of lock box units available to the party for a respective lock box type (or for a plurality of different lock box types), decide which lock box type should be used for the shipment to be deposited and enter the selection by making an entry at the input interface of the lock box facility or a respective input interface (not shown) of the mobile terminal. The acquisition of a lock box type selection can therefore be part of the step for the selection of a lock box unit.

After the lock box type has been established, the final selection of a lock box unit of the selected lock box type in which the shipment is to be deposited can be performed. This can be performed, for example, by the computing unit of the respective lock box facility or the server. Alternatively, the selection of a lock box unit of the selected lock box type can also be performed on the basis of an interaction of the party with the lock box facility, for example, by means of the input interface of the lock box facility or by means of the input interface of the mobile terminal or on the basis of an interaction of the party with the server, for example, by means of the input interface of the lock box facility or by means of the input interface of the mobile terminal. If a plurality of lock box units of the selected lock box type are available to the party, these lock box units can, for example, be displayed by providing a respective information on the display of the lock box unit or on the display of the mobile terminal.

In an exemplary embodiment of the first aspect of the invention, the determination of the number of lock box units of the lock box facility available to the party for at least one lock box type of at least one lock box type can be performed on the basis of at least one of: (i) a number of dynamically reserved lock box units of the lock box type; (ii) a number of statically reserved lock box units of the lock box type; (iii) a number of unreserved lock box units of the lock box type; and (iv) a sum of the number of dynamically reserved lock box units of the lock box type, the number of statically reserved lock box units of the lock box type, and the number of unreserved lock box units of the lock box type.

The number of the lock box units of a respective lock box type of at least one lock box type available to the party can, for example, be one of the following number:

The number of the dynamically reserved lock box units of the lock box type of the lock box facility;

The sum of the number of the dynamically reserved lock box units of the lock box type and the number of the available statically reserved lock box units of the lock box type;

The sum of the number of dynamically reserved lock box units of the lock box type, the number of the available statically reserved lock box units of the lock box type, and the number of the unreserved lock box units of the lock box type.

Thus, the number of the lock box units of a respective lock box type (or also a plurality of different lock box types) available to the party is determined on the basis of the reservation information associated with the party for this lock box facility which, in addition to the lock box type specific reservation information, can optionally also include the information about at least one statically reserved lock box unit of the lock box facility. In addition, the number of the lock box units of a respective lock box type available to the party can also take into account other available lock box units of the lock box types, so that it can be indicated to the party how many lock box units of the respective lock box type are currently available to the party. For instance this number of the lock box units available to the party for the respective different lock box types of the lock box facility can be displayed so that the party can be displayed a general overview that indicates the number of the available lock box units for every lock box type of the different lock box types. This number of the lock box units available to the party for a respective lock box type (or for a plurality of different lock box types) can be understood as part of or as the totality of the information about at least one lock box unit of the lock box facility in which a shipment associated with the party is to be deposited.

In an exemplary embodiment of the first aspect of the invention, the displaying furthermore comprises the display of information about available statically reserved lock box units of the lock box type, which identifies these statically reserved lock boxes of the lock box facility.

In an exemplary embodiment of the first aspect of the invention, the selection of a lock box unit of at least one lock box unit of the lock box facility is performed on the basis of an algorithm, which is carried out by a data processing system that is operatively connected to the lock box facility.

The data processing system can, for example, be the computing unit of the respective lock box facility, in which the shipment is to be deposited, or the computing unit of the server.

In an exemplary embodiment of the first aspect of the invention, the during selection of a lock box unit of at least one lock box unit, based on the provided information, it is preferably selected a lock box unit that is a statically reserved lock box unit for the party.

Thus, for example, first, the statically reserved lock box units of a specific lock box type of a lock box facility may be used for depositing a shipment, and then lock box units of the specific lock box type of the lock box facility are used for the deposit that were not specifically reserved as such by the party, but where a reservation of a number of lock box units of the respective lock box type was performed on the basis of the lock box type related information, or that were not even reserved for the party, but that are still available.

If, for example, a statically reserved lock box unit was used to deposit the shipment, the respective information about the occupied, statically reserved lock box unit can be stored in a database in the lock box facility and/or the server, so that this statically reserved lock box unit is identified as "unavailable" and, if applicable, no longer included in the determination of the number of lock box units of this lock box type available to the party.

In an exemplary embodiment of the first aspect of this invention, the lock box type to which the shipment is to be assigned can be determined on the basis of one of the following: (i) a database entry associated with the shipment's identification number which comprises information about the size of the shipment or the lock box type; (ii) an input of information about the size of the shipment or about the lock box type in the lock box facility; and (iii) an input of information about the size of the shipment or the lock box type on a mobile electronic device, which is configured for use by a party.

A selection of a lock box type of the lock box facility can be determined based on (ii) or (iii), for example, by the input interface of the lock box facility or by an input interface of the mobile terminal. Thus, the party can, for example, based on the optional number of lock box units available to the party for a respective lock box type (or for a plurality of different lock box types), decide which lock box type should be used for the shipment to be deposited and enter the selection by making an input at the input interface of the lock box facility or a respective input interface (not shown) of the mobile terminal. Furthermore, the party can also use the respective input interface to enter information about the size of the shipment, which will be used by a computing unit such as the computing unit of the respective lock box facility or the server to determine a suitable lock box type of the respective lock box facility based on the acquired information about the size of the shipment.

Based on the identifier, for example, which is physically associated with the shipment and which was acquired, a lock box type and/or the size of the shipment can be determined. As explained above, the size of the shipment can be used to determine a suitable lock box type of the lock box facility.

This determination of a lock box type can, for example, be performed on the basis of a database entry which is associated with the identification number of the shipment and which comprises information about the size of the shipment or the lock box type. Based on the information about the size of the shipment, for example, a respectively suitable lock box type of the respective lock box facility can be determined. This database entry can, for example, be part of a database stored in the lock box facility or on the server. When making a reservation, for example, as by the dynamic reservation of a lock box type by incrementing the number of the number of dynamically reserved lock box units of the respective lock box type on the basis of lock box type related information, an identifier (such as a shipment ID) can be generated or determined for the respective shipment, and this identifier can be linked with the respective lock box type and stored as a database entry. Subsequently, this shipment can then, for example, be provided with the respective identifier.

In this exemplary embodiment, the selection of the lock box type by the party during the shipment depositing process at the respective lock box facility is no longer necessary.

The party may be provided with the option, however, to use the input interface of the lock box facility or the input interface of the mobile terminal to select a different lock box type, which is different from the lock box type determined on the basis of the database entry.

In an exemplary embodiment of the first aspect of the invention, the display of the available lock box units of the lock box facility for at least one lock box type each is performed on the basis of the shipment size or on the basis of a lock box type associated with the shipment.

As an example, only the number of the lock box units in the lock box facility of the lock box type associated with the shipment is displayed.

In an exemplary embodiment of all aspects of the invention, the reservation information associated with the party is adjusted when the shipment's identification number has been linked to the selected lock box unit.

In an exemplary embodiment of all aspects of the invention, the adjustment comprises, when the shipment has been linked to a lock box unit, which is associated with the number of dynamically reserved lock box units of a lock box type, the reduction of the number of dynamically reserved lock box units of this lock box type.

Thus, upon having occupied a lock box unit of a lock box facility, which was occupied on the basis of the number of the dynamically reserved lock box units of a lock box type of the lock box facility reserved for the party, a number of dynamically reserved lock box units of this lock box type in the lock box facility is available to the party that has been reduced by a counter.

An exemplary embodiment of all aspects of the invention is configured for two or more parties, and each of the two or more parties is assigned reservation information for a respective at least one lock box facility of at least one lock box facility.

In an exemplary embodiment of all aspects of the invention, different priorities are associated with the two or more parties.

In an exemplary embodiment of all aspects of the invention, at least one party of at least one party is a logistics provider.

In an exemplary embodiment of all aspects of the invention, the detection of the removal of a shipment deposited in a lock box unit of a lock box facility, which is associated with a party, and the adjustment of reservation information associated with another party for this lock box facility is performed.

In an exemplary embodiment of all aspects of the invention, the lock box type related information for a lock box facility associated with a party does not comprise information about the assignment of a shipment to a lock box unit of a lock box facility of at least one lock box facility.

Thus, it is avoided during the dynamic reservation based on the lock box type related information associated with a party that a specific lock box unit or a plurality of specific lock box units of the lock box facility is reserved, which would subsequently be blocked and which could only be used by this party.

In an exemplary embodiment of the first aspects of the invention, the linking of identifiers of two or more shipments with a lock box unit of a lock box facility of at least one lock box facility is performed.

This way, a party can, for example, deposit two or more shipments in a lock box unit of a lock box facility.

In an exemplary embodiment of the first aspect of the invention, the shipment is used to exchange objects, especially keys.

According to the second aspect of the invention, an electronic request associated with a party and pertaining to a dynamic reservation of a specific number of lock box units of a lock box type of a lock box facility of at least one lock box facility is received; a check whether the requested number of lock box units of the lock box type is available for the party is performed; and if the requested number of lock box units of the lock box type is available for the party, the reservation information associated with the party and the lock box facility is adjusted. This information comprises lock box type related information whereby the lock box type related information pertaining to the lock box type of the lock box facility comprises information about the number of dynamically reserved lock box units of the lock box type, so that the specific number of lock box units of the lock box type of the lock box facility can be dynamically reserved.

This second aspect can be configured to make reservations for one or a plurality of lock box facilities. The method can, for example, at least partially or entirely, be performed by a computing unit of a lock box facility and/or at least partially or entirely, by a computing unit of a server.

The computing unit receives an electronic request associated with a party for the dynamic reservation of a specific number of lock box units of a lock box type of a lock box facility of at least one lock box facility. A party can, for example, link such an electronic request made through a terminal which can comprise, for example, the Internet via a communication link with the computing unit so that this electronic request can be received by the computing unit.

As already explained with regard to the dynamic reservation of a specific number of lock box units of a lock box type of a lock box facility for a party relative to the first aspect of the invention, the request for a dynamic reservation of a specific number of lock box units of a lock box type of a lock box facility of at least one lock box facility is to lead to a reservation of a number of lock box units of the specific lock box type, but not a reservation of specific lock box units of this lock box type of the lock box facility.

It is subsequently checked whether the requested number of lock box units of the lock box type is available for the party in the lock box facility. This check may, for example, include a verification that, from the generally available number of lock box units of the specific lock box type in the lock box facility, minus already made reservations (which may, for example, also take reservations by other parties into account) for this lock box type, a still sufficiently large number of remaining lock box units of the lock box type are available for the party.

If the verification step is successful, the reservation information associated with the party and the lock box facility, which comprises lock box related information wherein the lock box type related information for the lock box type of the lock box unit comprises information about the number of dynamically reserved lock box units of the lock box type, for the dynamic reservation of the defined number of lock box units of the lock box type of the lock box facility may be adjusted.

If the request comprises, for example, a dynamic reservation of a number of x lock box units of a lock box type, whereby x is a natural number (from 1, 2, 3, . . . ), the information associated with the party, for example, about the number of dynamically reserved lock box units of the lock box type of the lock box facility is increased by the number x. If the information associated with the party prior to the performance of the information adjustment about the number of dynamically reserved lock box units of the lock box type of the lock box facility corresponds to a number of zero reserved lock box units of the lock box type of the lock box facility, the information associated with the party and the lock box facility will be adjusted in such a way that the information about the number of dynamically reserved lock box units of the lock box type of the lock box facility corresponds to a number of x dynamically reserved lock box units of the lock box type. The term "to adjust" can therefore also, for example, be understood to pertain to the generation of new information about the number of dynamically reserved lock box units of a lock box type of a lock box facility, if this information previously did not exist.

If the information associated with the party prior to the adjustment of the information about the number of dynamically reserved lock box units of the lock box type of the lock box facility corresponds to a number of n (with n representing a natural number) reserved lock box units of the lock box type of the lock box facility, the information associated with the party and the lock box facility will be adjusted in such a way that the information about the number of dynamically reserved lock box units of the lock box type of the lock box facility corresponds to a number of n+x dynamically reserved lock box units of the lock box type.

Furthermore, for instance, if the full number of x lock box units of the lock box type of the lock box facility is not available for the party, a dynamic reservation of a number of z lock box units of the lock box type of the lock box facility can be made for the party, with z being a natural number and smaller than x, when at least a number of z lock box units of the lock box type of the lock box facility is available for the party. This dynamic reservation comprises an increase of the information associated with the party about the number of dynamically reserved lock box units of the first lock box type of the lock box facility by a number of z lock box units.

This reservation information can, for example, be used as reservation information for the first aspect of the invention.

In an exemplary embodiment of the second aspect of the invention, the lock box type associated with the request represents a first lock box type of the lock box facility, and the lock box facility comprises at least one other lock box type whereby the process furthermore includes the check as to whether a dynamic reservation for another lock box type of the lock box facility that differs from the first lock box type is possible, if the requested number of lock box units of the lock box type is unavailable for the party.

This other lock box type can, for example, be a lock box type that is larger than the first lock box type, for example, one size larger than the first lock box type. If it is determined, for example, that at least the number of one lock box unit of the other lock box type is available for the party, a reservation of a number of at least one lock box unit of the other lock box type in the lock box facility is possible.

Furthermore, this exemplary embodiment can, for example, be allowed for one party from a first group of at least one party, while this embodiment is not allowed for a party that is not part of the first group. Therefore, a party that is not part of the first group cannot use another lock box type instead.

Furthermore, the dynamic reservation performed in accordance with the reservation for another lock box type may, for example, not be allowed for any other lock box type. If, for example, the first lock box type is a lock box type with a specific minimum size, no other lock box type of a larger size than this specific minimum size can be used, so that, for example, the check is negative.

If, in an exemplary embodiment of the second aspect of the invention, the check to determine whether a dynamic reservation of at least one other lock box type of the lock box facility that is different from the first lock box type is possible is positive, an adjustment of the information for the dynamic reservation of a number of lock box units of the other lock box type of the lock box facility associated with the party and the lock box unit is performed whereby the lock box type related information for the other lock box type of the lock box unit comprises information about the number of dynamically reserved lock box units of the other lock box type.

If the request comprises, for example, a dynamic reservation of a number of x lock box units of a lock box type, with x being a natural number (from 1, 2, 3, . . . ), and if, for example, none of the x requested lock box units could be dynamically reserved, and if the number of y lock box units of the other lock box type of the lock box facility are available, the number of x lock box units of the other type of the lock box facility can be dynamically reserved for the party, if x is smaller or equal to y, by increasing the information about the number of the dynamically reserved lock box units of the other lock box type of the lock box facility associated with the party by a number of x lock box units. Or, the number of y lock box units of the other type of the lock box facility can be dynamically reserved for the party, if x is larger than y, by increasing the information associated with the party about the number of the dynamically reserved lock box units of the other lock box type of the lock box facility by a number of y lock box units.

If it was possible to perform a dynamic reservation of a number of z lock box units of the first lock box type of the lock box facility for the party in advance, with z being a natural number and z being smaller than x, whereby this dynamic reservation comprises an increase of the information associated with the party about the number of the dynamically reserved lock box units of the first lock box type of the lock box facility by a number of z lock box units, then the number x decreases in the aforementioned example by the already reserved number of z lock box units.

An exemplary embodiment of each of the aspects of the invention is configured for two or more parties, and each of the two or more parties is assigned reservation information for a respective at least one lock box facility of the at least one lock box facility.

In an exemplary embodiment of each of the aspects of the invention, different priorities have been associated with the two or more parties.

In an exemplary embodiment of the second aspect of the invention, the check as to whether the requested number of lock box units of the lock box type is available for the party depends on the priority associated with the party.

Furthermore, the performance of the check for a party as to whether the requested number of lock box units of the lock box type in the lock box facility is available for the party can, for example, be performed at a particular point in time, which depends on the respective party. If there is a plurality of parties, for example, who can make a reservation, different priorities can be associated with the parties, and based on which, for example, up to a particular point in time, which can, for example, be within a time window (such as, for example, a day or a week), only one party with a specific priority can make a dynamic reservation, so that the check up to this point in time can be performed only for one or a plurality of parties with this specific priority, so that this check cannot be performed by another party that has been assigned a priority that is lower than this specific priority until after this specific point in time. This way, it is possible for a party with the specific priority to make a preferred dynamic reservation, and parties with a lower priority can only subsequently make a dynamic reservation. Several successively staggered points in time may be possible, for example within a time window (such as a day or a week). In this case, each of the points in time are associated with a respectively different priority from a plurality of priorities.

Furthermore, for example, up to a specific point in time, the received requests from a party or from a plurality of parties can be collected, followed by the performance of the check for always one party each of whether the requested number of lock box units of the lock box type in the lock box facility is available for the party, and the subsequent steps are initiated in case of a successful or negative check, in the sequence of the parties' priorities, starting with the party with the highest priority, and subsequently for the parties of lower priorities, to determine whether the requested number of lock box units of the lock box type in the lock box facility is available for the party.

In an exemplary embodiment of the second aspect of the invention, the information associated with a party about the number of lock box units of the lock box type of the lock box facility requested but for which no dynamic reservation was made is stored, if the check whether the requested number of lock box units of the lock box type is available for the party is negative.

This exemplary embodiment can be used, for example, if not the entire number of x lock boxes requested by the party could be dynamically reserved, whereby this dynamic reservation can, for example, also comprise the potentially reserved number of lock box units of the other lock box type. If, for example, from the requested number of x boxes, the number of z lock box units of the first lock box type were dynamically reserved and if, for example, the number of y lock box units of the other lock box type were dynamically reserved for the party, the number of the requested lock box units of the lock box type for which no dynamic reservation was made can correspond to the number $x-z-y$. Thus, a pre-reservation of this remaining number of not dynamically reserved lock boxes of the first lock box type of the specific lock box facility can be made for the party, which can later be taken into account, for example, when lock box units of this first lock box type should become available again.

In an exemplary embodiment of the second aspect of the invention, the detection of the removal of a shipment deposited in a lock box unit of a lock box facility which is associated with a first party is performed.

This detection can be performed on the basis of an appropriate means of detection in the respective lock box facility, whereby the actual detection can be performed in the computing unit of the lock box unit or in the computing unit of the server.

In an exemplary embodiment of the second aspect of the invention, if information is stored for another party about the number of lock box units of a lock box type pertaining to a lock box facility for which no dynamic reservation was made, and if the lock box type from this information matches the lock box type of the lock box facility from which the shipment was removed, and if the lock box facility from this information matches the lock box facility from which the shipment was removed, comprising increasing the number of dynamically reserved lock box units of the lock box type of the lock box facility of the further party.

It is therefore possible to check whether information about a number of lock box units of a lock box type of a lock box facility for which no dynamic reservation was made has been stored for another party, which is different from the first party, whereby the lock box type from this information must match the lock box type of the lock box facility from which the shipment was removed, and the lock box facility from this information must match the lock box facility from which the shipment was removed. This information about a number of lock box units of a lock box type pertaining to a lock box facility for which no dynamic reservation was made could, for example, have been stored previously for this other party.

If the check is successful, the reservation information for the other party can be adjusted in that the information associated with the other party about the number of dynamically reserved lock box units of this lock box type of the lock box facility is incremented.

In an exemplary embodiment of the second aspect of the invention, a number of dynamically reserved lock box units of a lock box type is removed from a party's lock box type related information of a lock box facility if the number of dynamically reserved lock box units of a lock box type of the lock box facility has not been used by the party up to a specific point in time.

This way, the previously dynamically reserved number of dynamically reserved lock box units of a lock box type of a lock box facility can be released again for new reservations. The point in time may, for example, depend on the priority of the party which made the dynamic reservation.

The exemplary embodiments described above and the exemplary configurations for all aspects of the present invention are to be understood as disclosed in all combinations with each other as well.

Other advantageous exemplary embodiments of the invention can be found in the following detailed description of a few exemplary embodiments of the present invention, particularly in conjunction with the figures. The figures attached to the application only serve for clarification purposes but should not be used to define the protective scope of the invention. The attached drawings are not necessarily true to scale and are only intended to reflect the general concept of the present invention by way of examples. The features in particular that are contained in the figures should not be deemed a necessary component of the present invention.

DETAILED DESCRIPTION OF THE INVENTION

Figure 1:
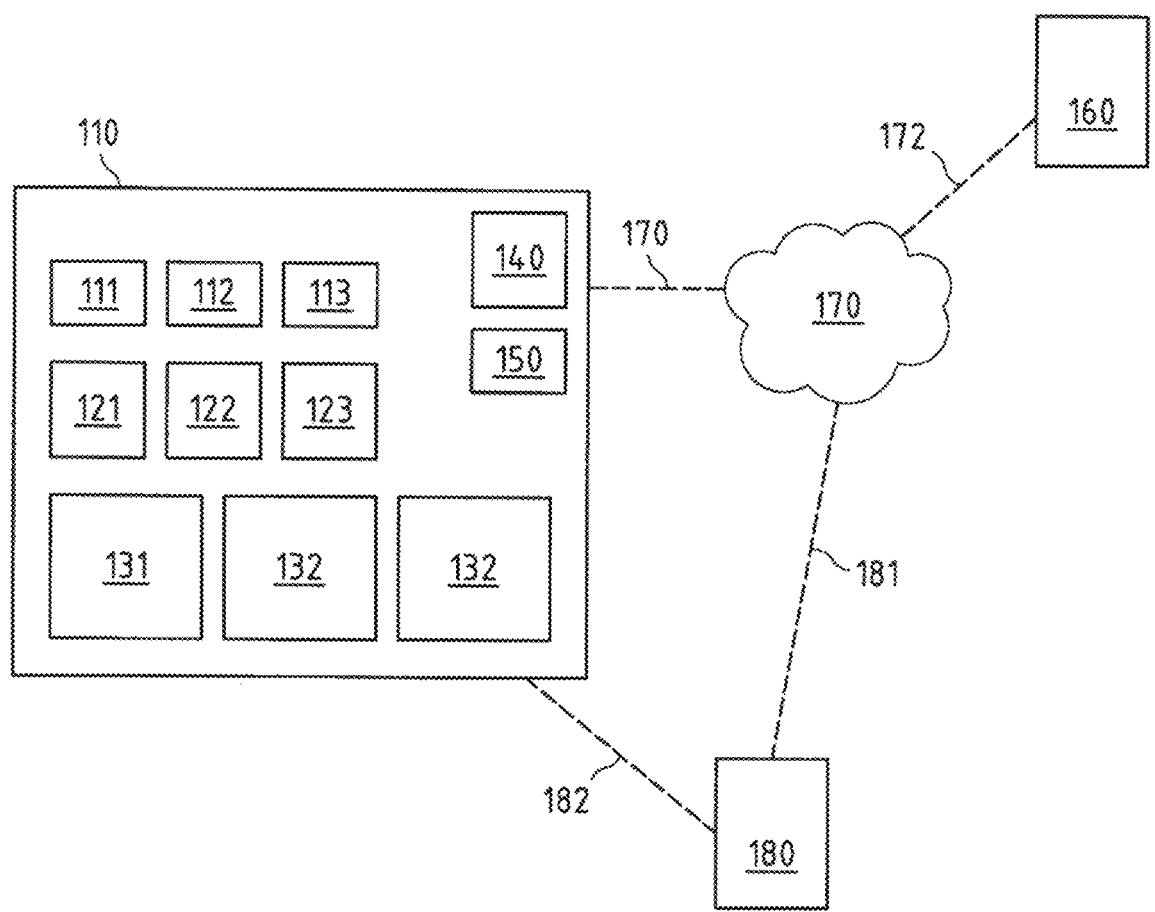
FIG. 1 shows a schematic representation of a system in which exemplary embodiments of the invention are used.

FIG. 1 shows a schematic representation of a system 100 in which exemplary embodiments of the invention can be used. The system comprises at least one electronic lock box facility 110. Even though FIG. 1 only shows a single lock box facility 110, FIG. 1 should not be understood as limiting, i.e., system 100 may also feature two or more electronic lock box facilities 110.

Each lock box facility 110 of the at least one lock box facility comprises a plurality of lock box units 111-113, 121-123, 131-133. Each of the lock box units 111-113, 121-123, 131-133 of the plurality of lock box units 111-113, 121-123, 131-133 is, for example, assigned a locking means which is configured to open or lock the respective lock box unit 111-113, 121-123, 131-133. The locking means can be controlled by an electric signal wherein, for example, a lock box facility 110 features a control unit to control the locking means of the lock box units 111-113, 121-123, 131-133. The lock box facility 110 may comprise different types of lock box units wherein the different lock box types differ, for example, in their form and/or size. The exemplary lock box units 111-113 shown in FIG. 1 may be associated with a first lock box type, the exemplary lock box units 121-123 shown in FIG. 1 may be associated with a second lock box type, and the exemplary lock box units 131-133 shown in FIG. 1 may be associated with a third lock box type. The first lock box type can, for example, be of a small size, the second lock box type may be, for example, of a medium size, and the third lock box type may, for example, be of a large size. It is understood that the invention is not limited to exactly three different lock box types, but may comprise any number of at least two different lock box types.

The lock box facility 110 can, for example, be connected with a server 160 via a data network 170 wherein the server 160 can be configured to control a lock box facility 110 of at least one lock box facility 110. This data network can comprise, for example, the Internet and/or other data networks.

Figure 2:
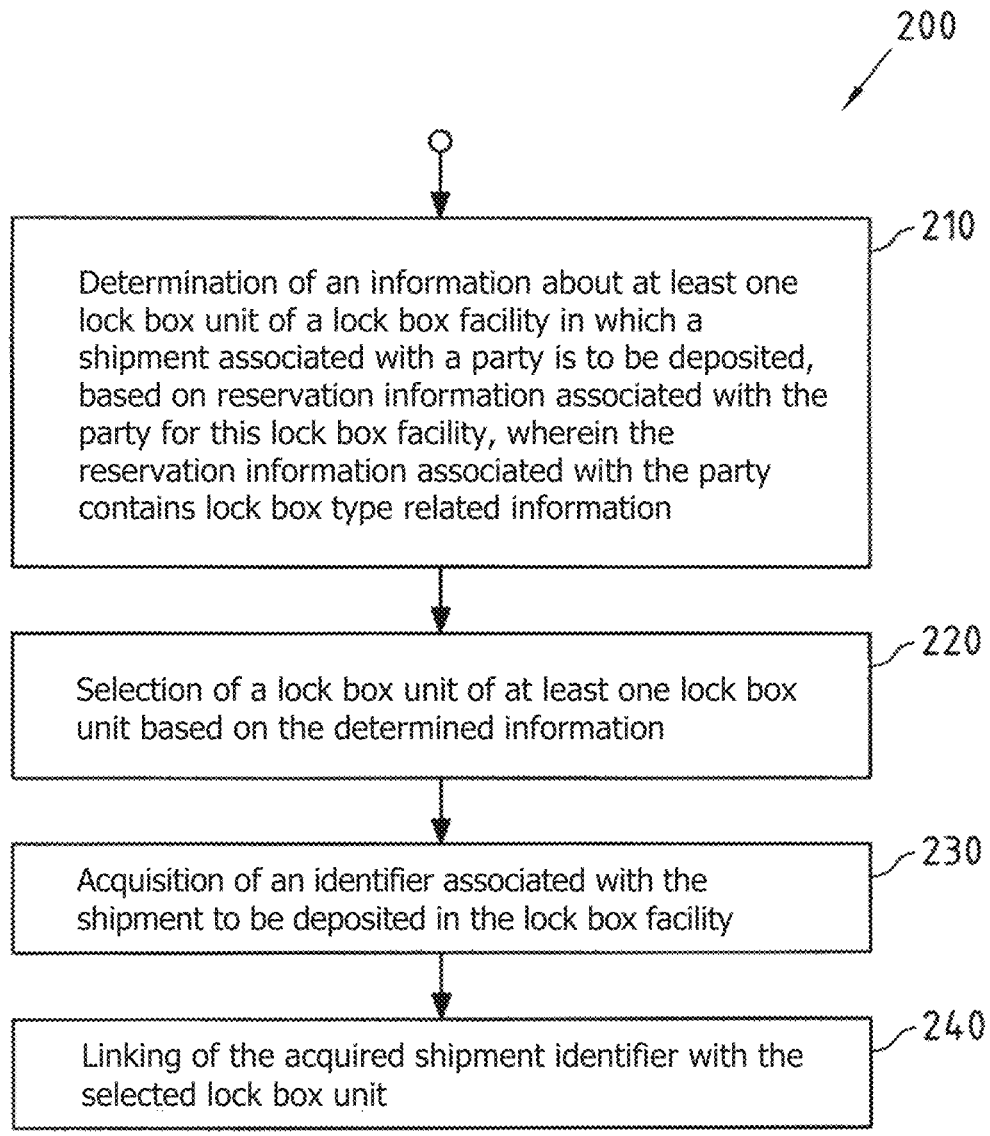
FIG. 2 shows a flow chart of a first exemplary embodiment of a method according to a first aspect of the invention.

The system shown in FIG. 1 and the method shown in FIG. 2, which represents a first exemplary embodiment of a method according to a first aspect of the invention, can be used to operate at least one electronic lock box facility 110.

If a party wants to deposit a shipment in a lock box unit of a lock box facility 110, this takes place on the basis of reservation information associated with the party for this lock box facility 110 which can, for example, be stored in the server 160 and/or in a memory of the respective lock box facility 110. This reservation information associated with the party and the lock box facility 110 comprises lock box type related information comprising for every lock box type of at least one lock box type of the respective lock box facility an information about the number of dynamically reserved lock box units of the lock box type. Thus, a party can reserve a number of lock box units of a lock box type for a particular lock box facility 110 in advance. A party may, for example, electronically access the server 160 by means of an interface and there store the respective lock box type related information for a lock box type or a plurality of lock box types of a lock box facility.

The number of lock box units can mean a number of exactly one or also a number of two or more lock box units. This lock box type related information associated with the party and the lock box facility 110, which comprises for every lock box type of at least one lock box type of the respective lock box facility information about the number of dynamically reserved lock box units of the lock box type, does not contain an assignment to a specific or a plurality of specific lock box units of the lock box type; ultimately, a number of lock box units of the respective lock box type in the respective lock box facility is reserved for the party without making a specific assignment to lock box units in the lock box facility.

Information about at least one lock box unit of a lock box facility of at least one lock box facility, in which a shipment associated with a party is to be deposited, is provided by a data processing unit based on reservation information associated with the party for this lock box facility when a party wants to deposit a shipment in a lock box unit of a lock box facility 110 as, for example, illustrated by the reference number 210 in FIG. 2. This data processing unit may, for example, be arranged in the lock box facility 110 or in the server 160. This information about at least one lock box unit of a lock box facility of at least one lock box facility in which a shipment associated with a party is to be deposited can, for example, only comprise the lock box type related information referenced above or, alternatively, other information as well.

Based on this acquired information about at least one lock box unit of a lock box facility of at least one lock box facility in which a shipment associated with a party is to be deposited, a lock box unit of at least one lock box unit of the lock box facility is selected for depositing the shipment, as illustrated, for example, by reference number 220 in FIG. 2. This selection process is carried out at least with support from the data processing unit of the lock box facility 110 and/or the data processing unit of the server 160. During the selection of a lock box unit of at least one lock box unit, it is therefore possible to take into account the reservation information from the party, including lock box type related information. Because the lock box type related information does not comprise any assignment to a particular lock box unit or a plurality of specific lock box units of the lock box facility, no specific lock box units of the lock box facility must be reserved in advance on the basis of the lock box type related information; rather, only the number of lock box units for the respectively reserved lock box type of the lock box facility is, for example, reserved in advance, so that, for example, the server 160 and/or the respective lock box facility 110 ensures that at least the reserved number of the lock box units for the respectively reserved lock box type of the lock box facility is kept available for the party; the availability of these units may, however, depend on other facts such as the priority of parties and/or the particular date and time for which the reservation is valid. This may have the advantage that no specific unit is reserved for a shipment in advance and is thus blocked by this reservation and that a shipment is not, for example, assigned until it is deposited in the respective lock box facility 110. This way, it is possible to avoid a lock box unit being firmly reserved for a shipment and turning out to be defective when the attempt is made to deposit the shipment, and it is therefore no longer possible to deposit the shipment in the lock box facility, because only the number of lock box units of the respective lock box type of the lock box facility 110 is reserved.

Therefore, the selection of a lock box unit of at least one lock box unit of the lock box facility 110 in step 220 takes place chronologically after the making of the reservation based on the lock box type related information. This selection does not occur, for example, until the party wishes to deposit the shipment in the respective local lock box facility 110 after having signed in and/or identified the party at the respective lock box facility 110 or the server 160 for the purpose of the subsequent depositing of the shipment in the lock box facility.

Furthermore, physically assigned identifiers of a shipment to be deposited in a lock box facility are acquired such as specific identifiers applied to the shipment, which may be a bar code, printed alphanumeric information, or another suitable identifier. This identifier may, for example, be a shipment ID with which the shipment can be tracked. The lock box facility 110 may, for example, comprise a means for the acquisition of this identifier physically associated with the shipment such as a scanner or another suitable means, or a mobile terminal 180 may be provided, which comprises this means to acquire this identifier physically associated with the shipment, whereas the mobile terminal may communicate the acquired identifier, for example, through a preferably wireless communication link 182 to the lock box facility 110 and/or the acquired identifier through a preferably wireless communication link 181 to the server 160.

After the selection of a lock box unit of the lock box facility in step 210, this lock box unit is, for example, automatically opened by the lock box facility 110, or the display means 140 of the lock box facility 110 may provide information indicating which lock box unit of the lock box facility 110 is to be used for depositing the shipment, so that the party can deposit the shipment in the opened lock box unit or the displayed lock box unit.

Furthermore, in step 240, the acquired identifier of the shipment is linked with the selected lock box unit. Thus, the shipment is associated with the selected lock box unit of the lock box facility 110 only when the shipment is deposited in the lock box unit, but not during the previous dynamic reservation.

Furthermore, the reservation information associated with a party and a lock box facility may also comprise information about at least one statically reserved lock box unit of the respective lock box facility. Thus, a party may, for example, firmly and therefore statically reserve at least one lock box unit of the lock box facility in addition to the lock box type related reservation, which does not comprise a specific lock box unit of a lock box facility. This static reservation of at least one lock box unit of a lock box facility does not, however, include an assignment of the statically reserved lock box to a shipment. Only the at least one statically reserved lock box unit of the lock box facility is reserved for the respective party. The number of dynamically reserved lock box units of the lock box facility reduces the number of potentially available for a dynamic reservation lock box units of a lock box type. A static reservation of a lock box unit may, for example, and in contrast to the dynamic reservation of a number of lock box units of a lock box type, continue to exist, so that the statically reserved lock box units of a lock box facility 110 remain available on a continual basis.

Figure 3A:
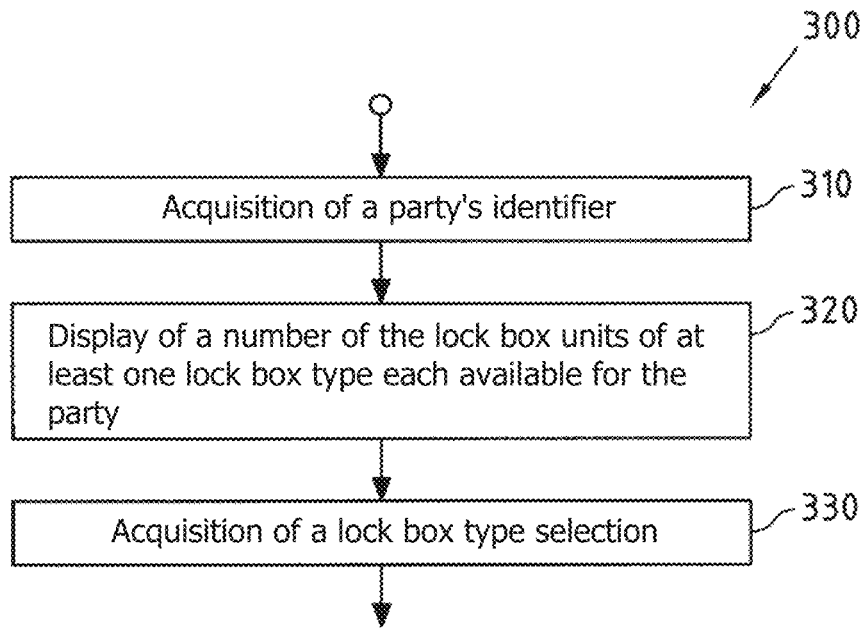
FIG. 3a shows a flow chart of a second exemplary embodiment of a method according to a first aspect of the invention.

FIG. 3a shows an exemplary flow chart of a method 300 according to an exemplary embodiment of the first aspect of the invention. This method 300 may, for example, be used for the exemplary method shown in FIG. 2 and, for example, supplement the same.

In step 310, the identification of a party which wants to deposit a shipment in a lock box facility 110 of at least one lock box facility 110 is acquired.

A party which wants to deposit a shipment in a specific lock box facility can, for example, identify itself to the lock box facility by interacting with the lock box facility at the lock box facility 110, for example, by means of input interface 150, which may be a key pad and/or a touch pad and/or a card reader and/or a transponder reader, which is configured to read RFID transponders or NFIC transponders or other transponders, and/or another entry means, or the party may log in whereby, for example, an identifier of the party is acquired by the input interface 150 during the log-in process. Alternatively, the party may log into the lock box facility with an optionally provided mobile terminal 180 which can, for example, connect to the respective lock box facility 110, preferably by means of a wireless communication link 182, by transmitting the identifier to the lock box facility 110.

Furthermore, the optional mobile terminal 180 may, for example, also be configured in such a way that it connects to the server 160, preferably by means of a wireless communication link 181, whereby the identifier of the party can be transmitted by means of this communication link to the server 160 and, for example, information about the selected lock box unit can be transmitted to the server 160 whereby the log-in and/or identification of the party can be executed either in the data processing unit of the server 160, or the server transmits data (such as, for example, the identifier) received from the mobile terminal 180 to the respective lock box facility 110 by means of the communication link 171, so that the party can log into the lock box facility 110.

This way, for example, the reservation information associated with this party from a database which is either stored in the lock box facility 110 and/or the server 160 can, at least partially, be read by the computing unit of the lock box facility 110 and/or the server 160 by means of this identification of the party by the lock box facility 110 and/or the server 160 and used by this computing unit to determine information about at least one lock box unit of the lock box facility, in which a shipment associated with the party is to be deposited, in step 210.

In step 320 of the method 320, the number of the lock box units of at least one lock box type each that is available for the party is displayed. This display can, for example, be made on the display 140 of the lock box facility and/or on a display of the party's mobile terminal 180. What can therefore be displayed to the party regarding a lock box type of the lock box facility 110 or regarding a plurality of lock box types of the lock box facility 110 is how many lock box units of the respective lock box type are available to the party for the deposit of shipments.

The determination of the number of lock box units for at least one lock box type of the lock box facility 110 available to the party can, for example, be performed by the server 160 or by the computing unit of the respective lock box facility 110. The number of the lock box units of a respective lock box type of at least one lock box type can, for example, be one of the following number:

The number of the dynamically reserved lock box units of the lock box type of the lock box facility;

The sum of number of the dynamically reserved lock box units of the lock box type and the number of the available statically reserved lock box units of the lock box type;

The sum of the number of the dynamically reserved lock box units of the lock box type, the number of the available statically reserved lock box units of the lock box type, and the number of the unreserved lock box units of the lock box type.

Thus, the number of the lock box units of a respective lock box type (or also a plurality of different lock box types) available to the party is determined on the basis of the reservation information associated with the party for this lock box facility which, in addition to the lock box type related reservation information, can optionally also include the information about at least one statically reserved lock box unit of the lock box facility 110. In addition, the number of the lock box units of a respective lock box type available to the party can also take into account other available lock box units of the lock box types, so that it can be indicated to the party how many lock box units of the respective lock box type are currently available to the party. For instance, this number of the lock box units available to the party can be displayed for the respective different lock box types of the lock box facility 110 so that the party can be displayed a general overview that indicates the number of the available lock box units for every lock box type of the different lock box types. For instance, this number of the lock box units available to the party for a respective lock box type (or for a plurality of different lock box types) can be understood as part of or as the totality of the information about at least one lock box unit of the lock box facility in which a shipment from the party is to be deposited, which is determined in step 210.

In step 330, a selection of a lock box type of the lock box facility is acquired, for example, by means of the input interface 150 of the lock box facility 110 or by means of the mobile terminal 180. Thus, the party can, for example, based on the number of lock box units available to the party for a respective lock box type (or for a plurality of different lock box types), decide which lock box type should be used for the shipment to be deposited and enter the selection by making an input at the input interface 150 of the lock box facility 110 or a respective input interface (not shown) of the mobile terminal 180. The acquisition of a lock box type selection in step 330 can therefore be part of the step 220 shown in FIG. 2 for the selection of a lock box unit.

After the lock box type has been determined, the final selection of a lock box unit of the selected lock box type in which the shipment is to be deposited can be performed. This can be performed, for example, by the computing unit of the respective lock box facility 110 or the server 160. Alternatively, the selection of a lock box unit of the selected lock box type can also be performed on the basis of an interaction of the party with the lock box facility, for example, by means of the input interface 150 of the lock box facility 110 or by means of the input interface of the mobile terminal 180 or on the basis of an interaction of the party with the server, for example, by means of the input interface 150 of the lock box facility 110 or by means of the input interface of the mobile terminal 180. If a plurality of lock box units of the selected lock box type are available to the party, these lock box units can, for example, be displayed by providing the respective information on the display 140 of the lock box unit or on the display of the mobile terminal.

The selection of a lock box unit of the selected lock box type can, for example, comprise the preferred selection of a lock box unit which represents a lock box unit that is statically reserved for the party. Thus, for example, first, the statically reserved lock box units of a specific lock box type may be used for depositing a shipment, and then lock box units of the specific lock box type are used for the deposit that were not specifically reserved as such by the party, but where a reservation of a number of lock box units of the respective lock box type was performed on the basis of the lock box type related information.

If, for example, a statically reserved lock box unit was used to deposit the shipment, the respective information about the occupied, statically reserved lock box unit can be stored in a database in the lock box facility 110 or the server 160, so that this statically reserved lock box unit is identified as "unavailable" and, if applicable, no longer included in the determination of the number of lock box units of this lock box type available to the party for step 210.

Furthermore, if the shipment has been linked to a lock box unit, which is associated with the number of this party's reserved lock box units of this lock box type, the number of this party's dynamically reserved lock box units of this lock box type can be reduced. This reduction can, for example, be carried out by the computing unit of the lock box facility 110 or by the server 160 whereby the reduction may represent the decrementing of the number of dynamically reserved lock box units of this lock box type of the respective party.

Figure 3B:
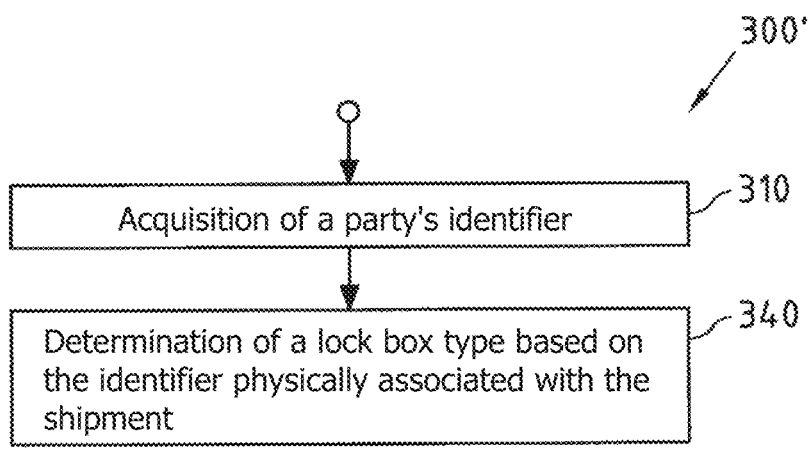
FIG. 3b shows a flow chart of a third exemplary embodiment of a method according to a first aspect of the invention.

FIG. 3b shows an exemplary flow chart of a method 300' according to another exemplary embodiment of the first aspect of the invention. This method 300' may, for example, be used for the exemplary method shown in FIG. 2 and, for example, supplement the same.

In step 310, the identification of a party which wants to deposit a shipment in a lock box facility 110 of at least one lock box facility 110 is acquired. This acquisition corresponds to the acquisition 310 explained in connection with FIG. 3a.

In step 340, a lock box type is determined on the basis of the identifier which has been physically associated with the shipment and which was acquired in step 230. This determination of a lock box type can, for example, be performed on the basis of a database entry which is associated with the identification number of the shipment and which comprises information about the size of the shipment or the lock box type. Based on the information about the size of the shipment, for example, a respectively suitable lock box type of the respective lock box facility can be determined. This database entry can, for example, be part of a database stored in the lock box facility 110 or on the server 160. When making a reservation, for example, as by the dynamic reservation of a lock box type by incrementing the number of the number of dynamically reserved lock box units of the respective lock box type on the basis of lock box type related information, an identifier (such as a shipment ID) can be generated or determined for the respective shipment and this identifier can be linked with the respective lock box type and stored as a database entry.

Subsequently, this shipment can then, for example, be provided with the respective identifier. In this exemplary embodiment, the selection of the lock box type by the party during the shipment depositing process at the respective lock box facility 110 is no longer necessary.

Subsequently, the method 300' may comprise the final selection of a lock box unit of the selected lock box type, as already explained in connection with method 300.

It applies to all exemplary embodiments that can be configured, for example, for two or more parties and that each of the two or more parties is assigned reservation information for at least one lock box facility each of at least one lock box facility. This reservation information associated with one of the parties comprises therefore at least lock box type related information for one of the respective parties, comprising for each lock box type of at least one lock box type of the respective lock box facility information about the number of dynamically reserved lock box units of the lock box type, and which, furthermore, may also comprise optional information about at least one statically reserved lock box unit of the respective lock box facility. At least one party of this plurality of parties may, for example, be a logistics provider.

The two or more parties may, for example, be assigned different priorities.

Figure 4:
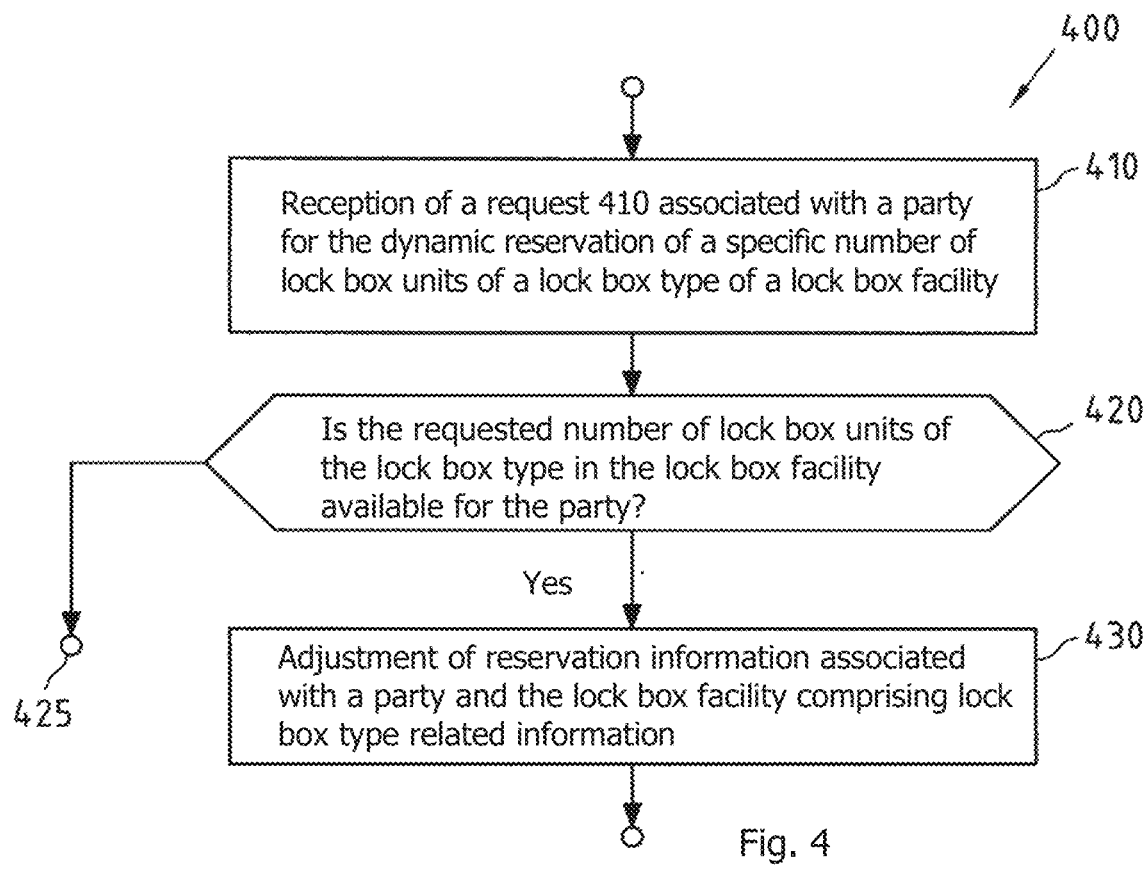
FIG. 4 shows a flow chart of a first exemplary embodiment of a method according to a second aspect of the invention.

FIG. 4 shows a flow chart of a first exemplary embodiment of a method 400 according to a second aspect of the invention.

This method 400 can be used for example for the system 100 shown in FIG. 1 and can be used to operate at least one lock box facility 110 of at least one lock box facility 110 whereby the method 400 is configured to make reservations for one or a plurality of lock box facilities 110. The method 400 can, for example, at least partially or entirely, be performed by a computing unit of a lock box unit 110 and/or, at least partially or entirely, by a computing unit of a server 160.

In step 410, the computing unit receives an electronic request associated with a party for the dynamic reservation of a specific number of lock box units of a lock box type of a lock box facility of at least one lock box facility. A party can, for example, link such an electronic request made through a terminal which can comprise, for example, the Internet via a communication link with the computing unit so that this electronic request can be received by the computing unit.

As already explained with regard to the dynamic reservation of a specific number of lock box units of a lock box type of a lock box facility for a party relative to the first aspect of the invention, the request for a dynamic reservation of a specific number of lock box units of a lock box type of a lock box facility of at least one lock box facility is to lead to a reservation of a number of lock box units of the specific lock box type, but not a reservation of specific lock box units of this lock box type of the lock box facility.

In step 420, it is checked whether the requested number of lock box units of the lock box type is available for the party in the lock box facility. This check in step 420 may, for example, include a verification that, from the generally available number of lock box units of the specific lock box type in the lock box facility, minus already made reservations for this lock box type, a still sufficiently large number of remaining lock box units of the lock box type are available for the party.

Furthermore, the performance of step 420 for a party to check whether the requested number of lock box units of the lock box type is available for the party in the lock box facility may, for example, be performed at a specific point in time, which depends on the respective party. If there is a plurality of parties, for example, who can make a reservation, different priorities can be associated with the parties, and based on which, for example, up to a particular point in time, which can, for example, be within a time window (such as, for example, a day or a week), only one party with a specific priority can make a dynamic reservation, so that the check in step 420 up to this point in time can be performed only for one or a plurality of parties with this specific priority, so that this check in step 420 cannot be performed by another party that has been assigned a priority that is lower than this specific priority until after this specific point in time. This way, it is possible for a party with the specific priority to make a preferred dynamic reservation, and parties with a lower priority can only subsequently make a dynamic reservation. Several successively staggered points in time may be possible, for example, like within a time window (such as a day or a week). In this case, each of the points in time are associated with a respectively different priority from a plurality of priorities.

Furthermore, for example, alternatively up to a specific point in time, the received requests received from a party or from a plurality of parties in step 410 can be collected, followed by the performance of the check for always one party each of whether the requested number of lock box units of the lock box type in the lock box facility 110 is available for the party, and the subsequent steps are initiated in case of a successful or negative check, in the sequence of the parties' priorities, starting with the party with the highest priority, and subsequently for the parties of lower priorities, to determine whether the requested number of lock box units of the lock box type in the lock box facility is available for the party.

If the verification in step 420 is successful, the method 400 can continue with step 430 to adjust reservation information associated with the party and the lock box unit, which comprises lock box related information wherein the lock box type related information for the lock box type of the lock box unit comprises information about the number of dynamically reserved lock box units of the lock box type, for the dynamic reservation of the defined number of lock box units of the lock box type of the lock box facility. If the request comprises, for example, a dynamic reservation of a number of x lock box units of a lock box type, whereby x is a natural number (from 1, 2, 3, . . . ), the information associated with the party, for example, about the number of dynamically reserved lock box units of the lock box type of the lock box facility 110 is increased by the number x. If the information about dynamically reserved lock box units of the lock box type of the lock box facility 110 associated with the party prior to the execution of step 430 represents a number of zero reserved lock box units of the lock box type of the lock box facility 110, then the reservation information associated with the party and the lock box facility is adjusted in such a way that the information about the number of dynamically reserved lock box units of the lock box type of the lock box facility 110 corresponds to a number of x dynamically reserved lock box units of the lock box type. If the information about dynamically reserved lock box units of the lock box type of the lock box facility 110 associated with the party prior to the execution of step 430 represents a number of n (with n representing a natural number) reserved lock box units of the lock box type of the lock box facility 110, then the reservation information associated with the party and the lock box facility is adjusted in such a way that the information about the number of dynamically reserved lock box units of the lock box type of the lock box facility 110 corresponds to a number of n+x dynamically reserved lock box units of the lock box type.

This reservation information can, for example, be used as reservation information for the first aspect of the invention.

Figure 5:
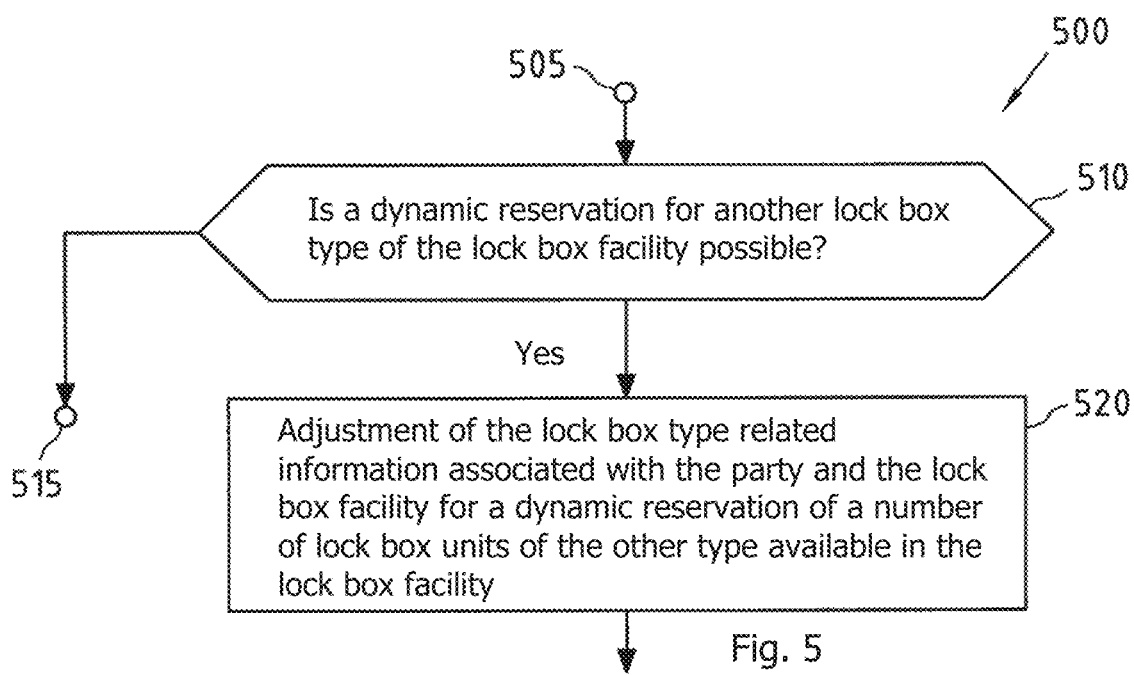
FIG. 5 shows a flow chart of a second exemplary embodiment of a method according to a second aspect of the invention.

FIG. 5 shows a flow chart of a second exemplary embodiment of a method 500 according to a second aspect of the invention which can, for example, be used for the first exemplary embodiment of method 400 shown in FIG. 4.

Method 500 can be used as a continuation of method 400 if it is found in step 420 that the number of lock box units in the lock box facility requested by the party is unavailable for the party, i.e., the reference number 425 in FIG. 4 can be connected to the reference number 505 in FIG. 5.

It is assumed that the lock box facility for which the party wanted to make a dynamic reservation based on the request received in step 410 comprises various types of lock box units (i.e., a plurality of lock box units) whereby the various lock box types differ, for example, in form and/or size, as already explained with regard to the first aspect of the invention. Thus, the lock box facility 110 may have a number of at least one lock box unit for each of the different lock box types.

In step 510, the system checks whether a dynamic reservation for another lock box type of the lock box facility is possible for the party whereby the other lock box type differs from the lock box type of the request, which can be referred to as the first lock box type. This other lock box type can, for example, be a lock box type that is larger than the first lock box type, for example, one size larger than the first lock box type. If it is found, for example, that at least the number of at least one lock box unit of the other lock box type is available for the party, a reservation of a number of at least one lock box unit of the other lock box type in the lock box facility 110 is possible, and the method can, in step 520, make an adjustment to the lock box type related information associated with the party and the lock box facility in the dynamic reservation regarding the number of lock box units of the other lock box type of the lock box facility. If the request comprises, for example, a dynamic reservation of a number of x lock box units of a lock box type, with x being a natural number (from 1, 2, 3, . . . ), and if, for example, none of the x requested lock box units could be dynamically reserved, and if the number of y lock box units of the other lock box type of the lock box facility are available, the number of x lock box units of the other type of the lock box facility can be dynamically reserved for the party, if x is smaller or equal to y, by increasing the information about the number of the dynamically reserved lock box units of the other lock box type of the lock box facility associated with the party by a number of x lock box units. Or, the number of y lock box units of the other type of the lock box facility can be dynamically reserved for the party, if x is larger than y, by increasing the information associated with the party about the number of the dynamically reserved lock box units of the other lock box type of the lock box facility by a number of y lock box units.

If it was possible to perform a dynamic reservation of a number of z lock box units of the first lock box type of the lock box facility for the party in advance, with z being a natural number and z being smaller than x, whereby this dynamic reservation comprises an increase of the information associated with the party about the number of the dynamically reserved lock box units of the first lock box type of the lock box facility by a number of z lock box units, then the number x decreases in the aforementioned example by the already reserved number of z lock box units. This dynamic reservation of a number of only z lock box units of the first lock box type for the party is possible, for example, in method 400 after step 420 and before the reference number 425.

Furthermore, method 500 shown in FIG. 5 can, for example, only be allowed for party from a first group of at least one party, while method 500 is not allowed for a party that is not part of the first group. Therefore, a party that is not part of the first group cannot use another lock box type instead.

Furthermore, the dynamic reservation performed in accordance with method 500 to reserve another lock box type may, for example, not be allowed for any other type of lock box type. If, for example, the first lock box type is a lock box type with a specific minimum size, no other lock box type of a larger size than this specific minimum size can be used, for example, and method 500 ends, if it is started at all, at reference number 515.

Figure 6A:
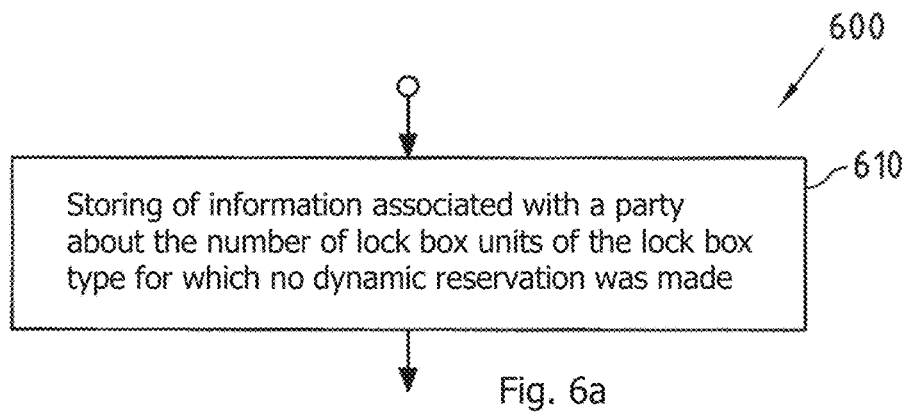
FIG. 6a shows a flow chart of a third exemplary embodiment of a method according to a second aspect of the invention.

FIG. 6a shows a flow chart of a third exemplary embodiment of a method 600 according to a second aspect of the invention. Method 600 comprises in step 610 the storing of information associated with a party about the number of lock box units of the lock box type of the request for which no dynamic reservation was made.

Method 600 can be used, for example, if not the entire number of x lock boxes requested by the party could be dynamically reserved, whereby this dynamic reservation can, for example, also comprise the number of lock box units of the other lock box type reserved in step 520. If, for example, from the requested number of x boxes, the number of z lock box units of the first lock box type were dynamically reserved and if, for example, the number of y lock box units of the other lock box type were dynamically reserved for the party, the number of the requested lock box units of the lock box type for which no dynamic reservation was made can correspond to the number x-z-y. Thus, a pre-reservation of this remaining number of not dynamically reserved lock boxes of the first lock box type of the specific lock box facility can be made for the party, which can later be taken into account, for example, when lock box units of this first lock box type should become available again.

Figure 6B:
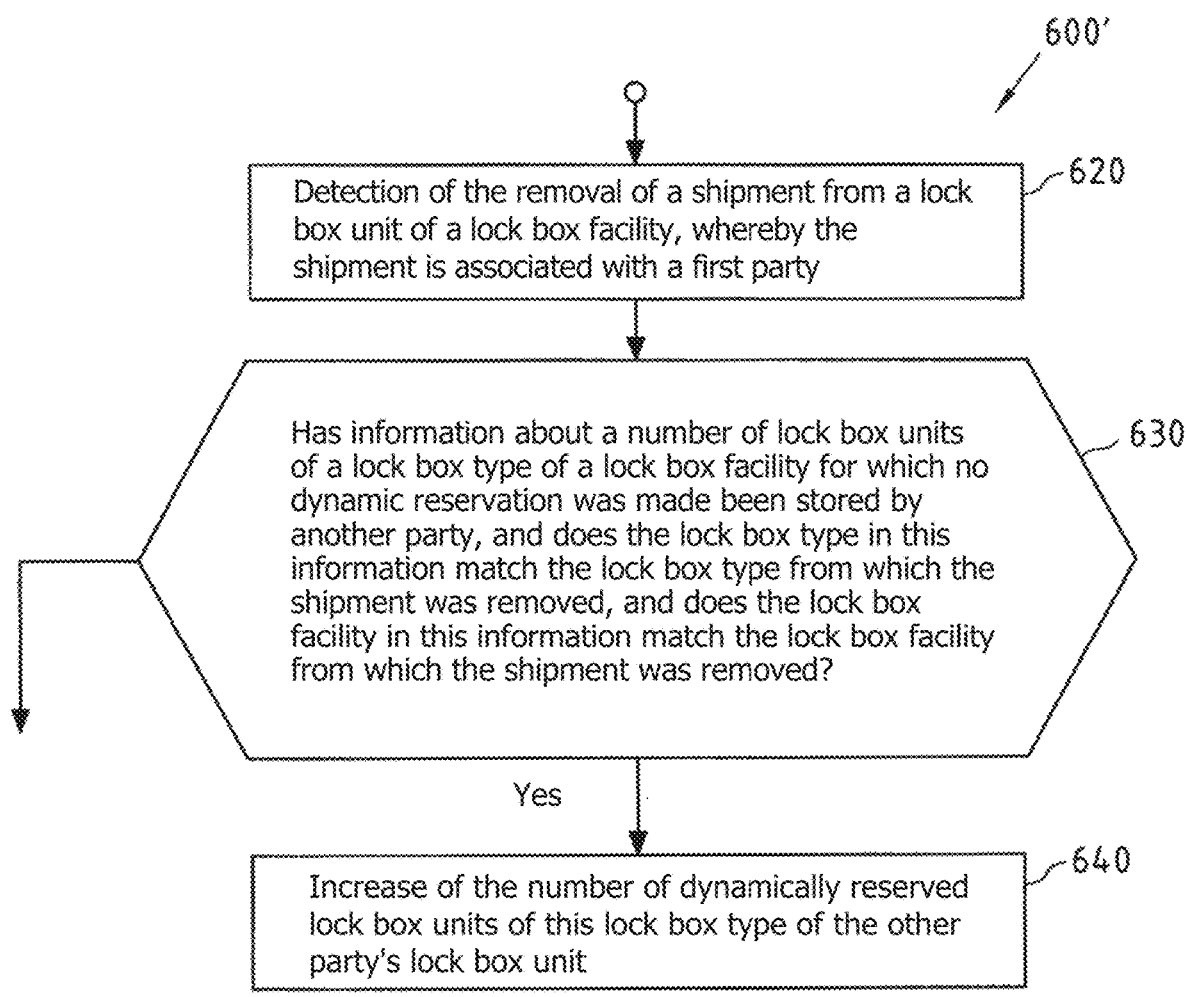
FIG. 6b shows a flow chart of a fourth exemplary embodiment of a method according to a second aspect of the invention.

FIG. 6b shows a flow chart of a fourth exemplary embodiment of a method 600' according to a second aspect of the invention which, for example, can be performed after method 600 shown in FIG. 6a has been performed for at least one party.

In step 630 of the method, the removal of a shipment deposited in a lock box unit of a lock box facility 110 is detected, which is associated with a first party. This detection can be performed on the basis of an appropriate means of detection in the respective lock box facility 110, whereby the actual detection can be performed in the computing unit of the lock box facility or in the computing unit of the server 160.

In step 630, the system checks whether information about a number of lock box units of a lock box type of a lock box facility for which no dynamic reservation was made has been stored for another party, which is different from the first party, whereby the lock box type from this information must match the lock box type of the lock box facility from which the shipment was removed, and the lock box facility from this information must match the lock box facility from which the shipment was removed. This information about a number of lock box units of a lock box type pertaining to a lock box facility for which no dynamic reservation was made could, for example, have been stored previously for this other party in step 610 of method 600.

If the check in step 630 is successful, the reservation information for the other party can be adjusted in that the information associated with the other party about the number of dynamically reserved lock box units of this lock box type of the lock box facility is incremented.

The exemplary embodiments of the present invention described in this specification are to be understood as disclosed in all combinations with each other as well. In particular, the description of a feature comprised by an embodiment should, if not explicitly stated to the contrary, not be understood to mean that the feature is indispensable or critical for the functioning of the exemplary embodiment. The sequence of the procedural steps illustrated in this specification in the individual flow charts is not obligatory, and alternative sequences of the procedural steps are possible. The procedural steps can be implemented in different ways; what is possible, for example, is an implementation in software (through program statements), hardware, or a combination of the two to implement the procedural steps. Terms used in the patent claims such as "comprise," "feature," "contain," and the like do not exclude additional elements or steps. The phrase "at least partially" pertains both to the case "partially" and the case "completely." The wording "and/or" should be understood to mean that both the alternative as well as the combination has been disclosed, i.e., that "A and/or B" means "(A) or (B) or (A and B)". A plurality of units, persons, or the like means in connection with this specification several units, persons, or the like. The use of the indefinite article does not exclude a plurality. One single apparatus can perform the functions of a plurality of the units and/or facilities named in the patent claims. Reference numbers provided in the patent claims should not be considered a limitation of the used means and steps.

The invention claimed is:

1. Method to operate at least one electronic lock box facility, comprising:
   receiving an electronic request associated with a party for the dynamic reservation of a specific number of lock box units of a lock box type of a lock box facility of at least one lock box facility,
   verificating that the requested number of lock box units of the lock box type is available for the party, and
   if the requested number of lock box units of the lock box type is available for the party, adjusting reservation information associated with the party and the lock box facility, which comprises lock box related information, wherein the lock box type related information for the lock box type of the lock box facility comprises information about the number of dynamically reserved lock box units of the lock box type, for the dynamic reservation of the defined number of lock box units of the lock box type of the lock box facility; and
   wherein the lock box type related information for a lock box facility associated with a party does not comprise information about the association of a shipment to a lock box unit of a lock box facility of at least one lock box facility.

2. Method according to claim 1, wherein the lock box type associated with the request constitutes a first lock box type of the lock box facility, and the lock box facility comprises at least one other lock box type whereby the method furthermore includes the check as to whether a dynamic reservation for another lock box type of the lock box facility that differs from the first lock box type is possible, if the requested number of lock box units of the lock box type is unavailable for the party.

3. Method according to claim 2, comprising, if the check to determine whether a dynamic reservation of at least one other lock box type of the lock box facility that is different from the first lock box type is possible is positive, adjusting the information for the dynamic reservation of a number of lock box units of the other lock box type of the lock box facility associated with the party and the lock box facility is performed whereby the lock box type related information for the other lock box type of the lock box facility comprises information about the number of dynamically reserved lock box units of the other lock box type.

4. Method according to claim 2, wherein two or more parties are allowed, and each of the two or more parties is associated with a reservation information for at least one lock box facility each of at least one lock box facility.

5. Method according to claim 4, wherein different priorities are associated with the two or more parties.

6. Method according to claim 5, wherein the check as to whether the requested number of lock box units of the lock box type is available for the party depends on the priority associated with the party.

7. Method according to claim 1, comprising, if the check whether the requested number of lock box units of the lock box type is available for the party is negative, storing information associated with a party about the number of lock box units of the lock box type of the lock box facility requested but for which no dynamic reservation was made.

8. Method according to claim 7, comprising detecting of the removal of a shipment deposited in a lock box unit of a lock box facility, which is associated with a first party.

9. Method according to claim 8, if information is stored for another party about the number of lock box units of a lock box type pertaining to a lock box facility for which no dynamic reservation was made, and if the lock box type from this information matches the lock box type of the lock box facility from which the shipment was removed, and if the lock box facility from this information matches the lock box facility from which the shipment was removed, comprising increasing the number of dynamically reserved lock box units of this lock box type of the lock box facility of the other party.

10. Method according to claim 1, comprising removing a number of dynamically reserved lock box units of a lock box type from a party's lock box type related information of a lock box facility if the number of dynamically reserved lock box units of a lock box type of the lock box facility has not been used by the party up to a specific point in time.

11. An apparatus, comprising at least one processor and at least one memory containing the program code, wherein the memory and the program code are configured to cause the apparatus with at least one processor to execute and/or control at least:
    operate at least one electronic lock box facility,
    receiving an electronic request associated with a party for the dynamic reservation of a specific number of lock box units of a lock box type of a lock box facility of at least one lock box facility,
    verificating that the requested number of lock box units of the lock box type is available for the party, and
    if the requested number of lock box units of the lock box type is available for the party, adjusting reservation information associated with the party and the lock box facility, which comprises lock box related information, wherein the lock box type related information for the lock box type of the lock box facility comprises information about the number of dynamically reserved lock box units of the lock box type, for the dynamic reservation of the defined number of lock box units of the lock box type of the lock box facility; and
    wherein the lock box type related information for a lock box facility associated with a party does not comprise information about the association of a shipment to a lock box unit of a lock box facility of at least one lock box facility.

12. Apparatus according to claim 11, wherein the lock box type associated with the request constitutes a first lock box type of the lock box facility, and the lock box facility comprises at least one other lock box type whereby the method furthermore includes the check as to whether a dynamic reservation for another lock box type of the lock box facility that differs from the first lock box type is possible, if the requested number of lock box units of the lock box type is unavailable for the party.

13. Apparatus according to claim 12, wherein the at least one memory and the computer program code are configured to, with the at least one processor, cause the apparatus to perform, if the check to determine whether a dynamic reservation of at least one other lock box type of the lock box facility that is different from the first lock box type is possible is positive, adjusting the information for the dynamic reservation of a number of lock box units of the other lock box type of the lock box facility associated with the party and the lock box facility is performed whereby the lock box type related information for the other lock box type of the lock box facility comprises information about the number of dynamically reserved lock box units of the other lock box type.

14. Apparatus according to claim 12, wherein two or more parties are allowed, and each of the two or more parties is associated with a reservation information for at least one lock box facility each of at least one lock box facility.

15. Apparatus according to claim 14, wherein different priorities are associated with the two or more parties.

16. Apparatus according to claim 15, wherein the check as to whether the requested number of lock box units of the lock box type is available for the party depends on the priority associated with the party.

17. Apparatus according to claim 11, wherein the at least one memory and the computer program code are configured to, with the at least one processor, cause the apparatus to perform, if the check whether the requested number of lock box units of the lock box type is available for the party is negative, storing information associated with a party about the number of lock box units of the lock box type of the lock box facility requested but for which no dynamic reservation was made.

18. Apparatus according to claim 17, wherein the at least one memory and the computer program code are configured to, with the at least one processor, cause the apparatus to perform detecting of the removal of a shipment deposited in a lock box unit of a lock box facility, which is associated with a first party.

19. Apparatus according to claim 18, wherein the at least one memory and the computer program code are configured to, with the at least one processor, cause the apparatus to perform, if information is stored for another party about the number of lock box units of a lock box type pertaining to a lock box facility for which no dynamic reservation was made, and if the lock box type from this information matches the lock box type of the lock box facility from which the shipment was removed, and if the lock box facility from this information matches the lock box facility from which the shipment was removed, increasing the number of dynamically reserved lock box units of this lock box type of the lock box facility of the other party.

20. Apparatus according to claim 11, wherein the at least one memory and the computer program code are configured to, with the at least one processor, cause the apparatus to perform removing a number of dynamically reserved lock box units of a lock box type from a party's lock box type related information of a lock box facility if the number of dynamically reserved lock box units of a lock box type of the lock box facility has not been used by the party up to a specific point in time.

* * * * *